United States Patent [19]

DeCristofaro et al.

[11] 4,260,666
[45] Apr. 7, 1981

[54] BRAZED METAL ARTICLES

[75] Inventors: Nicholas J. DeCristofaro, Chatham; Samuel Levinson, N. Brunswick, both of N.J.; Peter Sexton, Weston, Conn.

[73] Assignee: Allied Chemical Corporation, Morris Township, Morris County, N.J.

[21] Appl. No.: 50,006

[22] Filed: Jun. 18, 1979

[51] Int. Cl.³ ............................................. B32B 15/00
[52] U.S. Cl. ................................. 428/668; 75/134 F; 75/170; 75/171; 428/606; 428/680
[58] Field of Search ................. 75/170, 171, 134 F; 428/606, 668, 678, 680

[56] References Cited

U.S. PATENT DOCUMENTS

| | | | |
|---|---|---|---|
| 4,036,638 | 7/1977 | Ray et al. | 75/170 |
| 4,038,073 | 7/1977 | O'Handley et al. | 75/170 |

*Primary Examiner*—R. Dean
*Attorney, Agent, or Firm*—Ernest D. Buff; Gerhard H. Fuchs

[57] ABSTRACT

Brazing of metal parts employing a homogeneous, ductile, filler metal foil is disclosed. The brazing foil, useful for brazing cobalt based alloys, has a composition consisting essentially of 0 to about 4 atom percent iron, 0 to about 26 atom percent chromium, 0 to about 20 atom percent nickel, 0 to about 4 atom percent tungsten, 0 to about 4 atom percent molybdenum, 0 to about 20 atom percent boron, 0 to about 12 atom percent silicon, 0 to about 2 atom percent carbon and the balance essentially cobalt and incidental impurities. In addition to containing the foregoing elements within the above-noted composition ranges, the composition must be such that the total of iron, chromium, nickel, tungsten, molybdenum and cobalt ranges from about 75 to 85 atom percent and the total of boron, silicon and carbon ranges from about 15 to 25 atom percent. The ductile foil permits fabrication of preforms of complex shapes which do not require binders and/or fluxes necessary for brazing powders presently used to braze cobalt and nickel base alloys.

5 Claims, No Drawings

BRAZED METAL ARTICLES

BACKGROUND OF THE INVENTION

1. Field of the Invention

This invention relates to brazing of metal parts and, in particular, to a homogeneous, ductile cobalt based brazing material useful in brazing cobalt and nickel based alloys.

2. Description of the Prior Art

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, corrosion resistant, leak-tight joint is formed.

Nickel and cobalt based alloys are conventionally joined by means of hydrogen, inert gas or vacuum brazing techniques. Such methods are employed to maintain low levels of contamination in the joint area. For high service temperature applications, nickel or cobalt based brazing filler alloys, having American Welding Society designation BNi or BCo compositions, per AWS A5.8, are used. These alloys produce brazed joints with high temperature strength and corrosion ad oxidation resistance.

The brazing alloys suitable for use with cobalt and nickel based alloys contain a substantial amount (about 3 to 11 weight percent) of metalloid elements such as boron, silicon and carbon. Consequently, such alloys are very brittle and are available only as powder, powder-binder pastes, powder-binder tapes and bulky cast preforms. Powders are generally unsuitable for many brazing operations, such as dip brazing, and do not easily permit brazing of complex shapes. Although some powders are available as pastes employing organic binders, the binders form objectionable voids and residues during brazing.

Some brazing alloys are available in foil form. However, such materials are either fabricated only through a costly sequence of rolling and careful heat-treating steps or are prepared by powder metallurgical techniques. Rolled foil is not sufficiently ductile to permit stamping of complex shapes therefrom. Powder metallurgical foil is not homogeneous and employs binders, which form objectionable voids and residues during brazing.

Ductile glassy metal alloys have been disclosed in U.S. Pat. No. 3,856,513, issued Dec. 24, 1974 to H. S. Chen et al. These alloys include compositions having the formula $M_aY_bZ_c$, where M is a metal selected from the group consisting of iron, nickel, cobalt, vanadium and chromium, Y is an element selected from the group consisting of phosphorus, boron and carbon, and Z is an element selected from the group consisting of aluminum, silicon, tin, germanium, indium, atimony and beryllium, "a" ranges from about 60 to 90 atom percent, "b" ranges from about 10 to 30 atom percent and "c" ranges from about 0.1 to 15 atom percent. Also disclosed are glassy wires having the formula $T_iX_j$, where T is at least one transition metal and X is an element selected from the group consisting of phosphorus, boron, carbon, aluminum, silicon, tin, germanium, indium, beryllium and antimony, "i" ranges from about 70 to 87 atom percent and "j" ranges from about 13 to 30 atom percent. Such materials are conveniently prepared by rapid quenching from the melt using processing techniques that are now well-known in the art. No brazing composition are disclosed therein, however.

There remains a need in the art for a homogeneous, cobalt based brazing material that is available in ductile foil form.

SUMMARY OF THE INVENTION

In accordance with the invention, there is provided a homogeneous, ductile brazing foil useful as a filler metal for a brazed metal article. The brazing foil is composed of metastable material having at least 50 percent glassy structure, and has a thickness ranging from about 20 μm (0.0008 inch) to 90 μm (0.0035 inch). It has been found that use of a cobalt based brazing foil that is flexible, thin and homogeneous, as described above, improves braze joint strength, enhances joining precision and reduces process time.

More specifically, the brazing foil has a composition consisting essentially of 0 to about 4 atom percent iron, 0 to about 26 atom percent chromium, 0 to about 20 atom percent nickel, 0 to about 4 atom percent tungsten, 0 to about 4 atom percent molybdenum, 0 to about 20 atom percent boron, 0 to about 12 atom percent silicon, 0 to about 2 atom percent carbon and the balance essentially cobalt and incidental impurities. In addition to containing the foregoing elements within the above-noted composition ranges, the composition must be such that the total of iron, chromium, nickel, tungsten, molybdenum and cobalt ranges from about 75 to 85 atom percent and the total of boron, silicon and carbon constitutes the remainder, that is, about 15 to 25 atom percent.

The homogeneous brazing foil of the invention is fabricated by a process which comprises forming a melt of the composition and quenching the melt on a rotating quench wheel at a rate of at least about $10^5$ °C./sec.

The filler metal foil is easily fabricable as homogeneous, ductile ribbon, which is useful for brazing as cast. Advantageously, the metal foil can be stamped into complex shapes to provide braze performs.

Further, the homogeneous, ductile brazing foil of the invention eliminates the need for binders and pastes that would otherwise form voids and contaminating residues. Also, the filler material provided by the invention enables alternative brazing processes of cobalt and nickel based alloys, e.g., dip brazing in molten salts, to be employed.

DETAILED DESCRIPTION OF THE INVENTION

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with a preferred embodiment of the invention a homogeneous, ductile cobalt based brazing material in foil form is provide. The brazing foil has a composition consisting essentially of 0 to about 4 atom percent iron, 0 to about 26 atom percent chromium, 0 to about 20 atom percent nickel, 0 to about 4 atom percent tungsten, 0 to about 4 atom percent molybdenum, 0 to about 20 atom percent boron, 0 to about 12 atom percent silicon, 0 to about 2 atom percent carbon and the balance essentially cobalt and incidental impurities. The composition is such that the total of iron, chromium, nickel, tungsten, molybdenum and cobalt ranges from about 75 to 85 atom percent and the total of boron, silicon and carbon comprises the balance, that is about 15 to 25 atom percent. These compositions are compatible with and more noble than cobalt based alloys and are suitable for brazing nickel as well as cobalt base alloys.

By homogeneous is meant that the foil, produced, is of substantially uniform composition in all dimensions. By ductile is meant that the foil can be bent to a round radius as small as ten times the foil thickness without fracture.

Examples of brazing alloy compositions within the scope of the invention are set forth in Table I below.

TABLE I

| | Composition, % | | | | | | | | |
|---|---|---|---|---|---|---|---|---|---|
| | Co | Cr | Ni | Fe | W | Mo | B | Si | C |
| atom % | 75 | — | — | — | — | — | 13 | 12 | — |
| weight % | 90.2 | — | — | — | — | — | 2.9 | 6.9 | — |
| atom % | 51 | 26 | 2 | 2 | — | 3 | 15 | — | 1 |
| weight % | 59.5 | 26.8 | 2.3 | 2.2 | — | 5.7 | 3.2 | — | 0.3 |
| atom % | 44 | 24 | 9 | 2 | 2 | 0 | 17 | 0 | 2 |
| weight % | 51.3 | 24.7 | 10.4 | 2.2 | 7.3 | — | 3.6 | — | 0.5 |
| atom % | 33 | 22 | 20 | 3 | 4 | 0 | 18 | 0 | 0 |
| weight % | 36.3 | 21.4 | 21.9 | 3.1 | 13.7 | — | 3.6 | — | — |

The brazing temperature of the brazing alloys of the invention ranges from about 1,035° C. to 1,300° C.

The brazing foils of the invention are prepared by cooling a melt of the desired composition at a rate of at least about $10^5$° C./sec, employing metal alloy quenching techniques well-known to the glassy metal alloy art; see, e.g., U.S. Pat. No. 3,856,513, discussed earlier, the purity of all compositions is that found in normal commercial practice. A variety of techinques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantialy (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 20 to 90 μm (0.0008 to 0.0035 inch) thick, which is also the desired spacing between bodies being brazed. Such spacing mximizes the strength of the braze joint. Thinner foils stacked to form thickness greater than 90 μm may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are superior to various powder brazes of the same composition in providing good braze joints. This is probably due to the ability to apply the brazing foil where the braze is required, rather than depending on capillarity to transport braze filler from the edge of surfaces to be brazed.

EXAMPLES

EXAMPLE 1

Ribbons about 6.5 mm (0.25 inch) wide and about 40 to 60 μm (about 0.0010 to 0.0035 inch) thick were formed by squirting a melt of the particular composition by overpressure of argon onto a rapidly rotating copper chill wheel (surface speed about 1,000 to 2000 m/min). Metastable, homogeneous ribbons of substantially glassy alloys having compositions listed in Table II in weight percent and atom percent were produced.

TABLE II

| Sample | Composition, % | | | | | | | | |
|---|---|---|---|---|---|---|---|---|---|
| | Co | Cr | Ni | Fe | W | Mo | B | Si | C |
| 1 at % | 75 | — | — | — | — | — | 13 | 12 | — |
| wt % | 90.2 | — | — | — | — | — | 2.9 | 6.9 | — |
| 2 at % | 51 | 26 | 2 | 2 | — | 3 | 15 | — | 1 |
| wt % | 59.5 | 26.8 | 2.3 | 2.2 | — | 5.7 | 3.2 | — | 0.3 |
| 3 at % | 44 | 24 | 9 | 2 | 2 | — | 17 | — | 2 |
| wt % | 51.3 | 24.7 | 10.4 | 2.2 | 7.3 | — | 3.6 | — | 0.5 |
| 4 at % | 33 | 22 | 20 | 3 | 4 | — | 18 | — | — |
| wt % | 36.3 | 21.4 | 21.9 | 3.1 | 13.7 | — | 3.6 | — | — |
| 5 at % | 46 | 18 | 15 | — | 1 | — | 20 | — | — |
| wt % | 55.0 | 19.0 | 17.9 | — | 3.7 | — | 4.4 | — | — |
| 6 at % | 45 | 18 | 15 | — | 1 | — | 16 | 5 | — |
| wt % | 53.4 | 18.9 | 17.1 | — | 3.7 | — | 3.5 | 2.8 | — |

EXAMPLE 2

Tensile test specimens were cut from Haynes Alloy 188 ("Haynes" is a registered trademark of Cabot Corporation, Kokomo, Ind.), in strip form the composition of Haynes Alloy 188 is given in Table III).

TABLE III

| | Composition, Weight % | | | | | |
|---|---|---|---|---|---|---|
| Ni | Co | Cr | W | Fe | C | Others |
| Haynes Alloy No. 188 | 22 | bal. | 22 | 14 | 3 | 0.1 | 1.5 |

The thickness was 0.16 cm (0.063 inch). A brazing alloy of the invention, a glassy, ductile ribbon of nominal composition of Sample No. 1 and having dimensions 46 μm (0.0018 inch) thick by 6.3 mm (0.25 inch) wide, was used to braze the test specimens.

The tensile specimens were dimensioned and fabricated as lap shear specimens per AWS C3.2-63. The specimens were cut perpendicularly to the length direction. Braze joints were of the lap type, with the lap dimension carefully controlled to 0.95 cm (⅜ inch). Brazing specimens were degreased with warm benzene. Lap joints containing brazing ribbons of the invention were assembled with the ribbons side-by-side the length of the lap joint. In the case of these brazing alloys, the ribbons acted as the spacers. A single spot weld was used to hold the assembly together, as is common industrial practice.

Brazing was done in a vacuum furnace which was evacuated to a pressure of $1.33 \times 10^{-2}$ Pa ($10^{-4}$ Torr). The furnace was held at 1,300° C. for 15 minutes.

Upon brazing, three shear specimens were subjected to tensile shear testing, with the following results:

| Sample | Shear Strength | | Tensile Strength | | Area of Failure |
|---|---|---|---|---|---|
| | GPa | (psi) | GPa | (psi) | |
| 1-A | 0.113 | (16,320) | 0.338 | (48,960) | Base metal |
| 1-B | 0.112 | (16,267) | 0.336 | (48,800) | Base metal |
| 1-C | 0.120 | (17,333) | 0.359 | (52,000) | Base metal |

All brazes were observed to fail in the base metal and not in the braze; therefore, the values reported are lower bounds.

EXAMPLE 3

Tensile test specimens of Haynes Alloy 188 were prepared for brazing as in Example 2. A brazing alloy of the invention, a glassy ductile ribbon of nominal composition of Sample No. 2 and having dimensions 46 μm (0.0018 inch) thick by 6.3 mm (0.25 inch) wide was used to braze three test specimens.

Brazing was done in a vacuum furnace which was evacuated to a pressure of $1.33 \times 10^{-2}$ Pa ($10^{-4}$ Torr). The furnace was held at 1,300° C. for 15 minutes.

The brazed joints evidenced the following joint strengths.

| Sample | Shear Strength | | Tensile Strength | | Area of Failure |
|---|---|---|---|---|---|
| | GPa | (psi) | GPa | (psi) | |
| 2-A | 0.052 | (7573) | 0.313 | (45440) | Joint |
| 2-B | 0.094 | (13653) | 0.565 | (81920) | Joint |
| 2-C | 0.042 | (6133) | 0.254 | (36800) | Joint |

EXAMPLE 4

Tensile test specimens of Haynes Alloy 188 were pepared for brazing as in Example 2. A brazing alloy of the invention, a glassy ductile ribbon of nominal composition of Sample No. 3 and having dimensions 46 μm (0.0018 inch) thick by 3.2 mm (0.125 inch) wide was used to braze one test specimen.

Brazing was done in a vacuum furnace which was evacuated to a pressure of $1.33 \times 10^{-2}$ Pa ($10^{-4}$ Torr). The furnace was held at 1,300° C. for 15 minutes.

The brazed joints evidenced the following joint strengths:

| Sample | Shear Strength | | Tensile Strength | | Area of Failure |
|---|---|---|---|---|---|
| | GPa | (psi) | GPa | (psi) | |
| 3-A | 0.047 | (6880) | 0.285 | (41280) | Joint |

EXAMPLE 5

Tensile test specimens of Haynes Alloy 188 were prepared for brazing as in Example 2. A brazing alloy of the invention, a glassy ductile ribbon of nominal composition of Sample No. 4, and having the dimensions 41 μm (0.0016 inch) thick and 6.3 mm (0.25 inch) wide was used to braze two test specimens.

Brazing was done in a vacuum furnace evacuated to $1.33 \times 10^{-2}$ Pa ($10^{-4}$ Torr). The furnace was held at 1,200° C. for 15 minutes.

The brazed joints evidenced the following joint strengths.

| Sample | Shear Strength | | Tensile Strength | | Area of Failure |
|---|---|---|---|---|---|
| | GPa | (psi) | GPa | (psi) | |
| 4-A | 0.051 | (7413) | 0.301 | (44,480) | Joint |
| 4-B | 0.052 | (7627) | 0.316 | (45,760) | Joint |

What is claimed is:

1. A brazed metal article, said article having been brazed with a filler material in the form of a homogeneous, ductile brazing foil composed of metastable material having at least 50 percent glassy structure, said foil having a composition consisting essentially of 0 to about 4 atom percent iron, 0 to about 26 atom percent chromium, 0 to about 20 atom percent nickel, 0 to about 4 atom percent tungsten, 0 to about 4 atom percent molybdenum, 0 to about 20 atom percent boron, 0 to about 12 atom percent silicon, 0 to about 2 atom percent carbon and the balance essentially cobalt and incidental impurities, wherein the composition is such that the total of iron, chromium, nickel, tungsten, molybdenum and cobalt ranges from about 75 to 85 atom percent and the total of boron, carbon and silicon ranges from about 15 to 25 atom percent.

2. The brazed metal article of claim 1 wherein said foil is at least about 80% glassy.

3. The brazed metal article of claim 1 wherein said foil is substantially glassy.

4. The brazed metal article of claim 1 wherein said foil has a thickness ranging from about 20 μm to 90 μm.

5. A brazed metal article, said article having been brazed with a filler metal in the form of a homogeneous ductile cobalt based brazing foil composed of metastable material having at least 50 percent glassy structure, said foil having a thickness ranging from about 20 μm to 90 μm.

* * * * *